US012695243B2

(12) United States Patent
Takeda

(10) Patent No.: US 12,695,243 B2
(45) Date of Patent: Jul. 28, 2026

(54) ELECTRICAL CONNECTOR WITH LATCHING MECHANISM ON HOUSING FOR ENGAGING LATCHING MECHANISM ON HOUSING OF MATING CONNECTOR

(71) Applicant: YAZAKI CORPORATION, Tokyo (JP)

(72) Inventor: Hirotaka Takeda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 338 days.

(21) Appl. No.: 18/439,658

(22) Filed: Feb. 12, 2024

(65) Prior Publication Data

US 2024/0186749 A1 Jun. 6, 2024

Related U.S. Application Data

(63) Continuation of application No. PCT/JP2023/001982, filed on Jan. 23, 2023.

(30) Foreign Application Priority Data

Feb. 9, 2022 (JP) ................................ 2022-019062

(51) Int. Cl.
*H01R 13/627* (2006.01)
*H01R 13/639* (2006.01)

(52) U.S. Cl.
CPC ..... *H01R 13/6275* (2013.01); *H01R 13/6272* (2013.01); *H01R 13/627* (2013.01); (Continued)

(58) Field of Classification Search
CPC ............ H01R 13/6275; H01R 13/6272; H01R 13/627; H01R 13/6271; H01R 13/6273; H01R 13/639
See application file for complete search history.

(56) References Cited

U.S. PATENT DOCUMENTS

2017/0018874 A1 1/2017 Kida

FOREIGN PATENT DOCUMENTS

CN 106602356 A * 4/2017 ........... H01R 13/514
JP 2015-195126 A 11/2015

OTHER PUBLICATIONS

International Search Report and Written Opinion of the International Search Report for PCT/JP2023/001982 dated Apr. 18, 2023.

* cited by examiner

*Primary Examiner* — Justin M Kratt
(74) *Attorney, Agent, or Firm* — KENEALY VAIDYA LLP

(57) ABSTRACT

A housing includes a housing body fitted to a counterpart housing, and a locking mechanism provided on the housing body and configured to lock a lock projection formed on the counterpart housing. The locking mechanism includes a lock arm having a cantilever shape and having a locking portion configured to lock the lock projection at a tip end portion of the lock arm, and a pair of operation arms continuously provided on both sides of the locking portion of the lock arm and extending rearward in a fitting direction, the pair of operation arms being connected to each other at end portions to form an operation portion. The lock arm includes a movement restricting projection at a position facing the operation portion. The operation portion abuts on the movement restricting projection and is restricted from moving forward in the fitting direction.

3 Claims, 6 Drawing Sheets

(52) U.S. Cl.
CPC ...... *H01R 13/6271* (2013.01); *H01R 13/6273* (2013.01); *H01R 13/639* (2013.01)

ELECTRICAL CONNECTOR WITH LATCHING MECHANISM ON HOUSING FOR ENGAGING LATCHING MECHANISM ON HOUSING OF MATING CONNECTOR

CROSS-REFERENCE TO RELATED APPLICATIONS

The present application is a continuation application of PCT/JP2023/001982 that claims priority to Japanese Patent Application No. 2022-019062 filed on Feb. 9, 2022, the entire content of which is incorporated herein by reference.

TECHNICAL FIELD

The present disclosure relates to a housing and a connector.

BACKGROUND ART

As shown in FIG. 6, a locking mechanism 1 as disclosed in JP2015-195126A includes a lock arm 2 that rises from a housing and extends forward in a fitting direction with a counterpart connector from a base end portion 6, and the lock arm 2 has a locking portion 3 in which a locking hole 3*a* for locking a lock projection of the counterpart connector is formed at a distal end serving as a free end. Further, the lock arm 2 includes a pair of operation arms 4 extending rearward in the fitting direction from both sides of the locking portion 3, and an operation portion 5 connecting rear end portions of the pair of operation arms 4. In the locking mechanism 1, when the operation portion 5 of the operation arm 4 is pressed down, the lock arm 2 is elastically deformed to release the locking of the lock projection by the locking portion 3.

In a connector including the housing having the locking mechanism 1 having the configuration described above, for example, when an excessive external force is applied to the locking mechanism 1 during conveyance or the like, the locking mechanism 1 may be deformed or damaged.

For example, when an excessive external force F (see FIG. 6) is applied to the operation portion 5 of the operation arm 4 forward in the fitting direction with the counterpart connector, the operation portion 5 is displaced forward (in an arrow A direction in FIG. 6), and the operation arm 4 is bent in a width direction. As a result, excessive stress is applied to a connected portion between the operation arm 4 and the locking portion 3 of the lock arm 2, and breakage or damage such as a crack or a fracture may occur in the connected portion between the operation arm 4 and the locking portion 3 of the lock arm 2.

The present disclosure provides a housing and a connector in which breakage or damage to a locking mechanism due to application of an external force is prevented.

SUMMARY OF INVENTION

The above object of the present disclosure is achieved by the following configuration.

A housing including:

a housing body fitted to a counterpart housing; and a locking mechanism provided on the housing body and configured to lock a lock projection formed on the counterpart housing, in which the locking mechanism includes:

a lock arm having a cantilever shape, extending forward in a fitting direction with the counterpart housing in the housing body and having a locking portion configured to lock the lock projection at a tip end portion thereof; and a pair of operation arms continuously provided on both sides of the locking portion of the lock arm and extending rearward in the fitting direction, the pair of operation arms being connected to each other at end portions to form an operation portion, the lock arm includes a movement restricting projection at a position facing the operation portion, and the operation portion abuts on the movement restricting projection and is restricted from moving forward in the fitting direction.

DESCRIPTION OF EMBODIMENTS

Specific embodiments according to the present disclosure will be described below with reference to the drawings.

Figure 1:
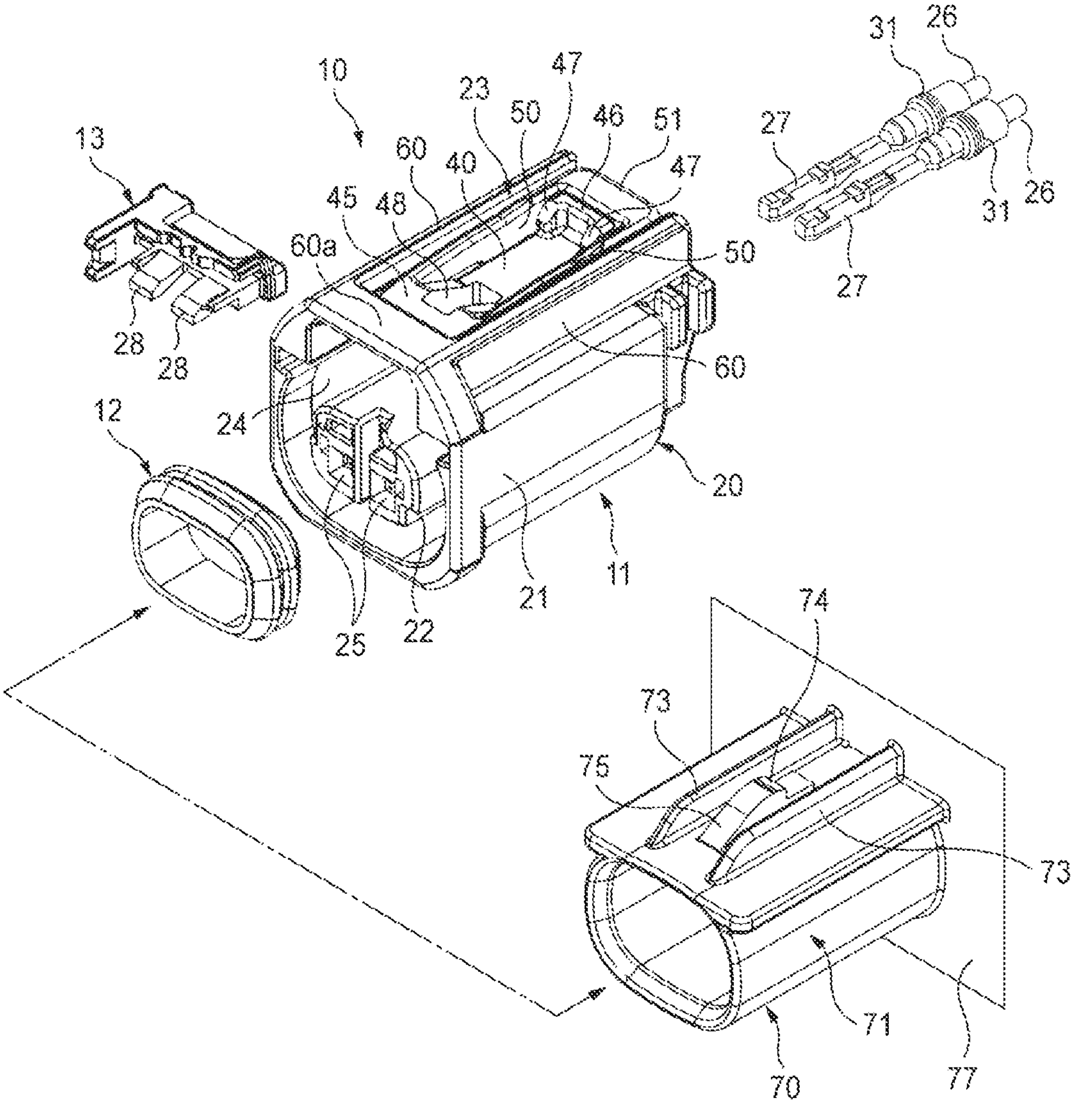
FIG. 1 is an exploded perspective view of a connector including a housing according to an embodiment and a counterpart connector.
Figure 2:
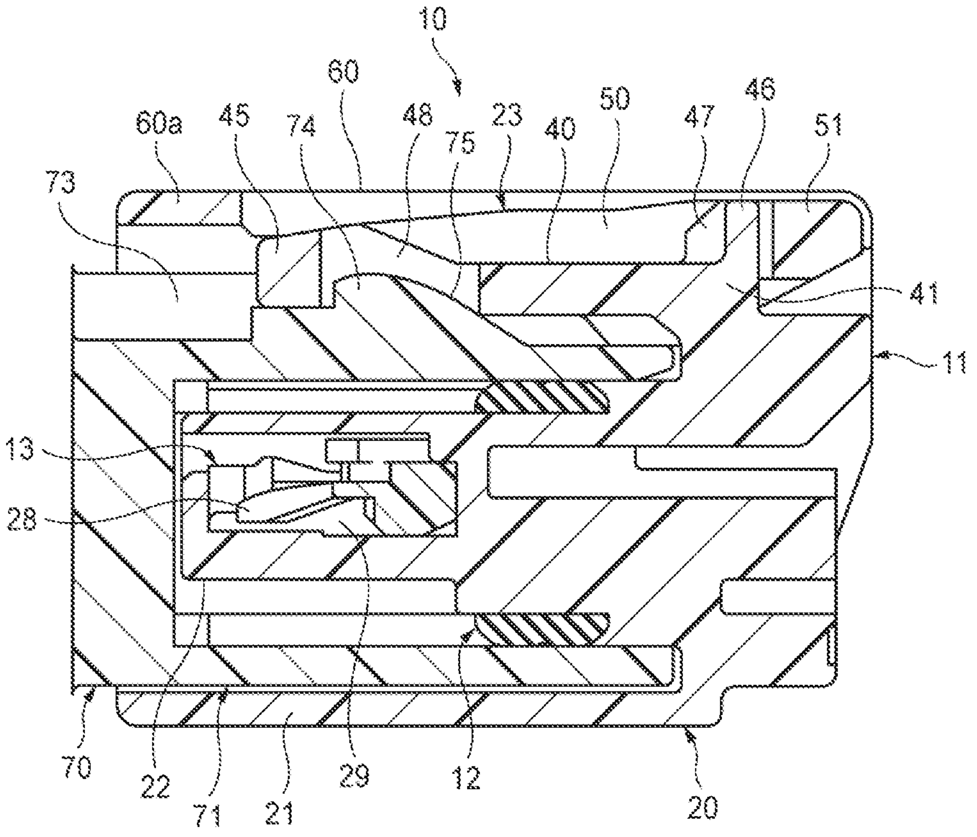
FIG. 2 is a longitudinal sectional view of the housing fitted into a counterpart housing.
Figure 3:
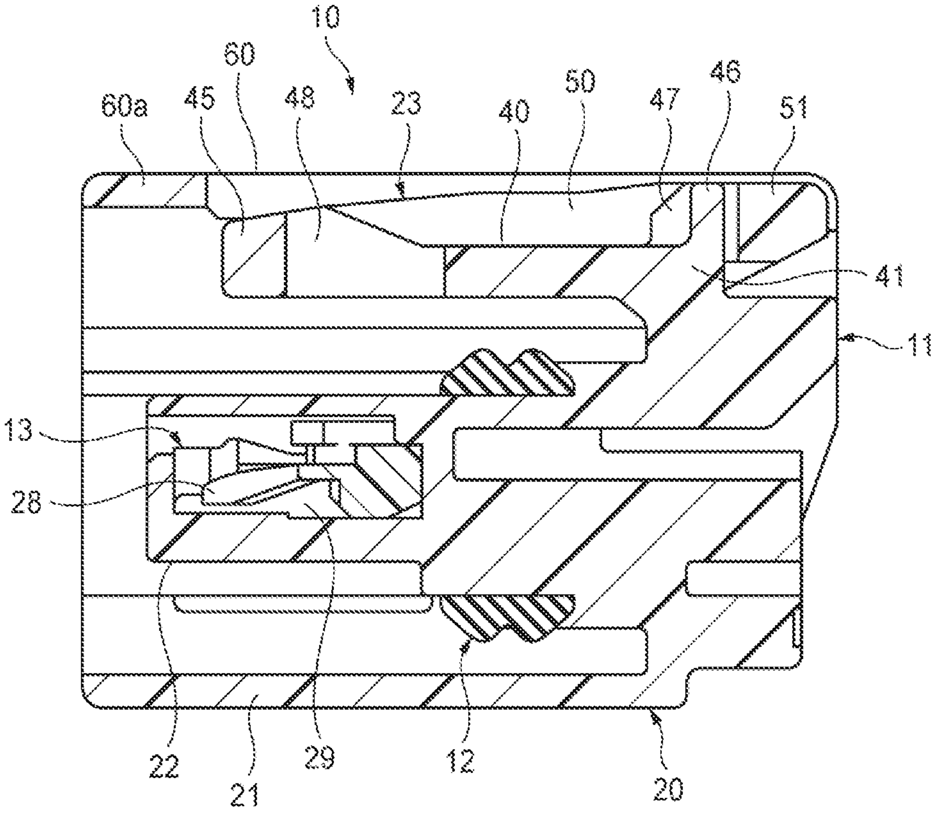
FIG. 3 is a longitudinal sectional view of the housing.

FIG. 1 is an exploded perspective view of a connector including a housing and a counterpart connector according to the present embodiment. FIG. 2 is a longitudinal sectional view of the housing fitted into a counterpart housing. FIG. 3 is a longitudinal sectional view of the housing.

As shown in FIG. 1, the housing 11 according to the present embodiment constitutes a connector 10 together with female terminals 27. The housing 11 is molded from synthetic resin, and a packing 12 and a retainer 13 are mounted to the housing 11.

As shown in FIGS. 2 and 3, the housing 11 includes a housing body 20, a fitting portion 22, and a locking mechanism 23. The housing body 20 has a tubular hood portion 21, and the locking mechanism 23 is formed integrally with an upper portion of the hood portion 21.

A tubular counterpart housing 71 of a counterpart connector 70 is fit into the hood portion 21 of the housing body 20. Thus, the connector 10 is joined to the counterpart connector 70. An opening portion 24 is formed on one side portion of the hood portion 21 of the housing body 20 (see FIG. 1).

The fitting portion 22 is provided inside the hood portion 21 of the housing body 20. The fitting portion 22 is formed integrally with the housing body 20 on a rear end side of the housing body 20. The fitting portion 22 has a plurality of terminal accommodating chambers 25 (see FIG. 1) and protrudes forward in a fitting direction (hereinafter, simply referred to as a fitting direction) with the counterpart connector 70. Each female terminal (terminal) 27 formed of a conductive metal material such as copper or a copper alloy is accommodated in the terminal accommodating chamber 25 of the fitting portion 22. Each female terminal 27 is connected to an electric wire 26, and the electric wire 26 is drawn out from a rear end of the housing body 20. The electric wire 26 is provided with a rubber plug 31, and the rubber plug 31 is fitted into the terminal accommodating chamber 25 to stop water in the terminal accommodating chamber 25.

The packing 12 is formed of, for example, an elastic material such as synthetic rubber or natural rubber, and is formed in an annular shape. The packing 12 is externally fitted to the fitting portion 22 and is disposed at a root portion of the fitting portion 22. The packing 12 is in close contact with an inner peripheral surface of the counterpart housing 71 fitted into the hood portion 21 of the housing body 20. Thus, the housing 11 and the counterpart housing 71 are sealed to each other, and a waterproof property of a fitting portion is ensured.

The retainer 13 is formed of, for example, a synthetic resin and has a plurality of lance portions 28. The retainer 13 is inserted through the opening portion 24 formed in the hood portion 21 and is fit and accommodated in an accommodating portion 29 formed in the fitting portion 22. Thus, the lance portions 28 of the retainer 13 are arranged in the terminal accommodating chambers 25 formed in the fitting portion 22, and the female terminals 27 inserted into the terminal accommodating chambers 25 are locked by the lance portions 28 of the retainer 13.

Figure 4:
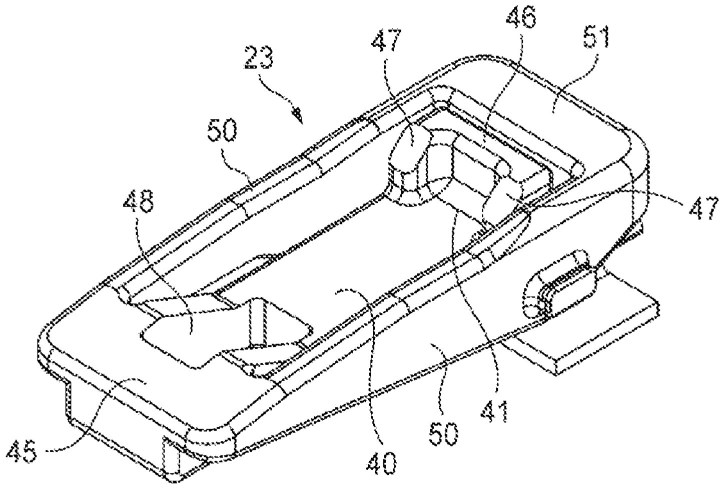
FIG. 4 is a perspective view of a locking mechanism provided in the housing.

FIG. 4 is a perspective view of the locking mechanism provided in the housing.

As shown in FIG. 4, the locking mechanism 23 includes a lock arm 40 and a pair of operation arms 50. The lock arm 40 and the operation arms 50 are integrally formed with the housing body 20. A pair of protection walls 60 are formed on the housing body 20, and the protection walls 60 are erected on both side portions of the locking mechanism 23 (see FIGS. 1 to 3). Thus, both side portions of the locking mechanism 23 are protected by the protection walls 60. Distal end sides of the protection walls 60 are connected by a connection portion 60*a*.

The lock arm 40 rises from an outer surface of the housing body 20 and extends forward in the fitting direction with the counterpart housing 71. Thus, the lock arm 40 is formed in a cantilever shape with a portion connected to the housing 11 as a base end portion 41.

The lock arm 40 has a locking portion 45 for locking a lock projection 74 (to be described later) formed on the counterpart housing 71 at a distal end portion as a free end. A locking hole 48 is formed in the locking portion 45, and the lock projection 74 is engaged with the locking hole 48.

The operation arms 50 are connected to both sides of the locking portion 45 of the lock arm 40. The operation arm 50 extends rearward in the fitting direction with the counterpart housing 71. Rear end portions of the operation arms 50 are connected to each other, and the connection portion is an operation portion 51. The operation portion 51 is disposed at a position behind the base end portion 41 of the lock arm 40 in the fitting direction.

The lock arm 40 constituting the locking mechanism 23 has a movement restricting projection 46. The movement restricting projection 46 is formed on the base end portion 41 of the lock arm 40 and projects upward from the housing 11. The movement restricting projection 46 is disposed at a position facing the operation portion 51 of the operation arm 50, and is disposed with a predetermined gap from the operation portion 51. Further, the movement restricting projection 46 includes wall portions 47 disposed along the respective operation arms 50 at both end portions thereof. The wall portions 47 are disposed with a predetermined amount of gap with respect to the respective operation arms 50.

As shown in FIG. 1, the counterpart housing 71 is integrally formed with, for example, a case body 77 of various devices. In addition, the counterpart housing 71 may be fixed to the case body 77. The counterpart housing 71 of the counterpart connector 70 is formed of synthetic resin, and a plurality of male terminals (counterpart terminals) (not shown) are provided inside the counterpart housing 71.

The counterpart housing 71 includes a pair of guide projecting ridges 73 and the lock projection 74 on an upper portion thereof. The guide projecting ridges 73 are formed at intervals along the fitting direction with the connector 10 of the housing 11. The lock projection 74 is formed at a center position in a width direction of the housing 71 between the pair of guide projecting ridges 73. The lock projection 74 protrudes from an upper surface of the counterpart housing 71, and a guide surface 75 that is inclined upward toward a rear end side of the connector 10 is formed on the front side thereof in the fitting direction.

Next, a case where the housing 11 of the connector 10 and the counterpart housing 71 of the counterpart connector 70 are fitted to each other will be described.

The hood portion 21 of the housing 11 is brought close to the counterpart housing 71 to fit the fitting portion 22. Then, the locking mechanism 23 is guided by the guide projecting ridge 73 of the counterpart housing 71, and the locking portion 45 of the lock arm 40 comes into contact with the guide surface 75 of the lock projection 74.

When the housing 11 is pushed into the counterpart housing 71, the locking portion 45 of the lock arm 40 in contact with the guide surface 75 of the lock projection 74 slides along the guide surface 75 and starts to ride thereon, and the lock arm 40 is elastically deformed.

When the housing 11 is further pushed into the counterpart housing 71 and the locking portion 45 climbs over the lock projection 74, the lock projection 74 is engaged with the locking hole 48 of the locking portion 45 and the elastically deformed lock arm 40 is restored. Thus, the lock projection 74 is locked to the locking portion 45 of the lock arm 40, and the housing 11 is locked to the counterpart housing 71 in a state of being fitted to the counterpart housing 71. In this fitted state, the female terminal 27 of the connector 10 and the male terminal of the counterpart connector 70 are electrically connected.

Next, a case of separating the housing 11 of the connector 10 from the counterpart housing 71 of the counterpart connector 70 will be described.

To separate the housing 11 from the counterpart housing 71, the operation portion 51 of the operation arm 50 of the locking mechanism 23 is pressed down. Then, the lock arm 40 is swung, the locking portion 45 of the lock arm 40 is displaced in a direction away from the housing body 20, and the lock projection 74 is pulled out from the locking hole 48 of the locking portion 45. Thus, the locking of the lock projection 74 by the locking portion 45 is released, and the lock between the housing 11 and the counterpart housing 71 is released.

In this state, by separating the housing 11 and the counterpart housing 71, the connector 10 and the counterpart connector 70 are separated, and an electrical connection state between the female terminal 27 and the male terminal is released.

Figure 5:
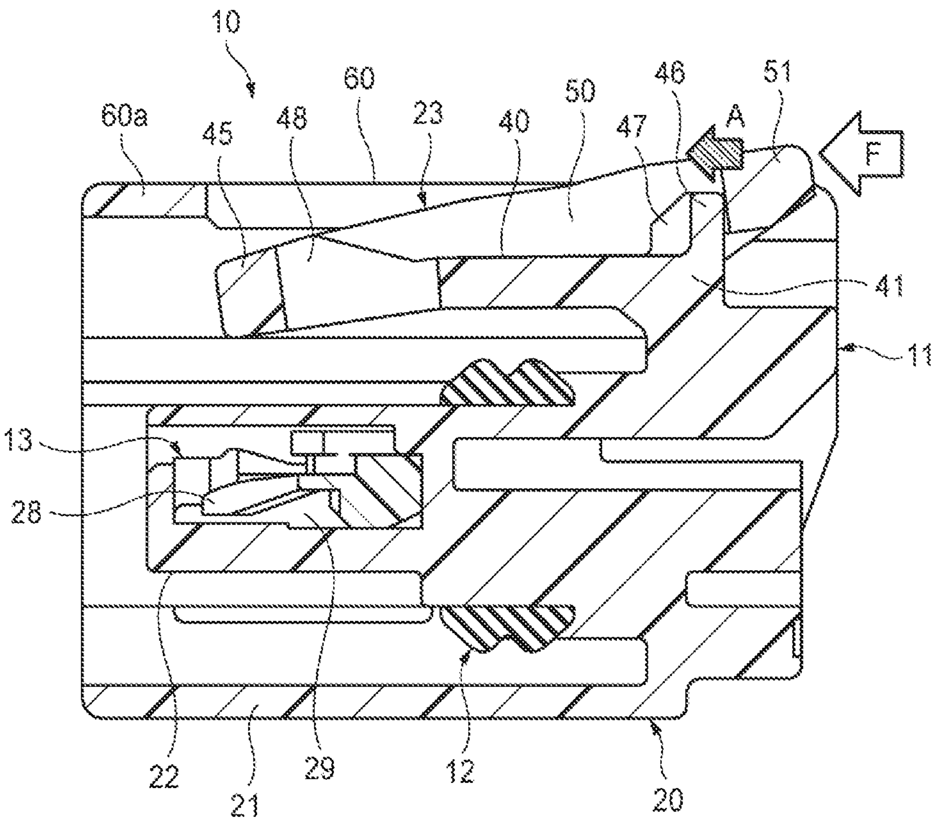
FIG. 5 is a longitudinal sectional view of the housing illustrating a state of the locking mechanism to which an external force is applied.
Figure 6:
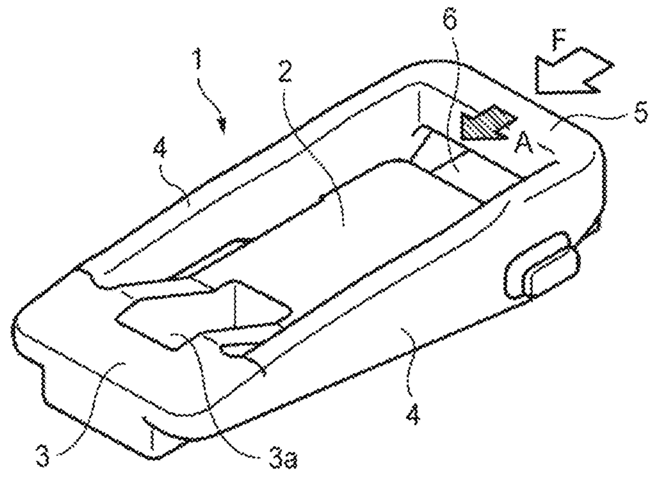
FIG. 6 Prior Art
FIG. 6 is a perspective view showing a locking mechanism of a housing of a structure in the related art.

In the housing 11 according to the present embodiment including the locking mechanism 23, as shown in FIG. 5, for example, an excessive external force F may be applied to the operation portion 51 of the operation arm 50 toward the front side in the fitting direction with the counterpart connector 70 when the housing 11 is conveyed.

At this time, in the housing 11 according to the present embodiment, when the operation portion 51 is displaced forward (in an arrow A direction in FIG. 5) in the fitting direction by the external force F, the operation portion 51 abuts on the movement restricting projection 46 formed on the base end portion 41 of the lock arm 40, and a forward movement of the operation portion 51 in the fitting direction is restricted. Accordingly, application of excessive stress to the connected portion between the operation arm 50 and the locking portion 45 of the lock arm 40 due to the deflection of the operation arm 50 in the width direction by the movement of the operation portion 51 is prevented.

As described above, according to the housing 11 of the present embodiment, it is possible to prevent breakage or damage such as a crack or a fracture at the connected portion between the operation arm 50 and the locking portion 45 of the lock arm 40 due to excessive stress applied to the connected portion between the operation arm 50 and the locking portion 45 of the lock arm 40 when the operation portion 51 moves forward in the fitting direction.

The movement restricting projection 46 for restricting the movement of the operation portion 51 includes the wall portion 47 along the operation arm 50. Accordingly, the wall portion 47 of the movement restricting projection 46 can maintain the operation arm 50 in a stable posture and prevent the deflection. As a result, it is possible to more favorably prevent breakage or damage such as a crack or a fracture at the connected portion between the operation arm 50 and the locking portion 45 of the lock arm 40 due to an external force applied during conveyance or the like.

According to the connector 10 including the housing 11 having the configuration described above, it is possible to provide a highly reliable connector by including the housing 11 which is prevented from being broken or damaged by an external force applied during conveyance or the like.

Note that the present disclosure is not limited to the embodiment described above, and modifications, improvements, and the like can be appropriately made. In addition, materials, shapes, sizes, numbers, arrangement positions and the like of components in the embodiment described above are freely selected and are not limited as long as the present invention can be implemented.

Here, features of the housing and the connector according to the embodiment of the present disclosure described above are briefly summarized and listed in the following (i) to (iii).

(i) A housing (11) including:
- a housing body (20) fitted to a counterpart housing (71); and
- a locking mechanism (23) provided on the housing body (20) and configured to lock a lock projection (74) formed on the counterpart housing (71),
- wherein the locking mechanism (23) includes:
  - a lock arm (40) having a cantilever shape, extending forward in a fitting direction with the counterpart housing (71) in the housing body (20) and having a locking portion (45) configured to lock the lock projection (74) at a tip end portion thereof; and
  - a pair of operation arms (50) continuously provided on both sides of the locking portion (45) of the lock arm (40) and extending rearward in the fitting direction, the pair of operation arms (50) being connected to each other at end portions to form an operation portion (51),
  - wherein the lock arm (40) includes a movement restricting projection (46) at a position facing the operation portion (51), and
  - wherein the operation portion (51) abuts on the movement restricting projection (46) and is restricted from moving forward in the fitting direction.

According to the housing having the configuration of the above (i), for example, even when the operation portion moves forward in the fitting direction while bending the operation arm due to application of an excessive external force toward the forward side in the fitting direction to the operation portion during conveyance or the like, the operation portion abuts on the movement restricting projection of the lock arm and the movement is restricted. Accordingly, it is possible to prevent breakage or damage such as a crack or a fracture at the connected portion between the operation arm and the locking portion of the lock arm due to excessive stress applied to the connected portion between the operation arm and the locking portion of the lock arm when the operation portion moves forward in the fitting direction.

(ii) The housing according to (i),
- wherein the movement restricting projection (46) includes a wall portion (47) extending along the operation arm (50).

According to the housing having the configuration of the above (ii), the wall portion of the movement restricting projection can maintain the operation arm in a stable posture and prevent the deflection. Accordingly, it is possible to more favorably prevent breakage or damage such as a crack or a fracture at the connected portion between the operation arm and the locking portion of the lock arm due to an external force during conveyance or the like.

(iii) A connector including:
- the housing (11) according to (i) or (ii); and
- a terminal (female terminal 27) fitted into the counterpart housing (71) to be electrically connected to a counterpart terminal provided in the counterpart housing (71).

According to the connector having the configuration of the above (iii), it is possible to provide a highly reliable connector by including the housing which is prevented from being broken or damaged by an external force applied during conveyance or the like.

Although various embodiments have been described above with reference to the drawings, it is needless to say that the present disclosure is not limited to such an example. It is apparent to those skilled in the art that various changes or modifications can be conceived within the scope described in the claims, and it is understood that the changes or modifications naturally fall within the technical scope of the present disclosure. In addition, the components described in the above embodiment may be freely combined without departing from the spirit of the disclosure.

What is claimed is:

1. A housing comprising:
- a housing body configured to be fitted to a counterpart housing; and
- a locking mechanism provided on the housing body and configured to lock a lock projection formed on the counterpart housing,
- wherein the locking mechanism includes:
  - a lock arm having a cantilever shape, extending forward in a fitting direction with the counterpart housing in the housing body and having a locking portion configured to lock the lock projection at a tip end portion of the lock arm; and
  - a pair of operation arms continuously provided on both sides of the locking portion of the lock arm and extending rearward in the fitting direction, the pair of operation arms being connected to each other at end portions to form an operation portion, wherein the lock arm includes a movement restricting projection at a position facing the operation portion, and wherein the operation portion abuts on the movement restricting projection and is restricted from moving forward in the fitting direction.

2. The housing according to claim 1, wherein the movement restricting projection includes a wall portion extending along the operation arm.

3. A connector comprising:

the housing according to claim 1; and a terminal fitted into the counterpart housing to be electrically connected to a counterpart terminal provided in the counterpart housing.

* * * * *